(12) United States Patent
Kellie et al.

(10) Patent No.: US 7,414,759 B2
(45) Date of Patent: Aug. 19, 2008

(54) SCANNER LINEARITY TESTER

(75) Inventors: Truman F. Kellie, Lakeland, MN (US); William D. Edwards, New Richmond, WI (US)

(73) Assignee: Samsung Electronics Co., Ltd., Suwon-si (KR)

( * ) Notice: Subject to any disclaimer, the term of this patent is extended or adjusted under 35 U.S.C. 154(b) by 982 days.

(21) Appl. No.: 10/723,175

(22) Filed: Nov. 26, 2003

(65) Prior Publication Data

US 2005/0111010 A1 May 26, 2005

(51) Int. Cl.
*H04N 1/04* (2006.01)

(52) U.S. Cl. .......................... 358/474; 358/1.2; 358/1.5; 358/1.7; 358/1.9; 356/28.5; 356/121; 250/234; 345/235; 345/129

(58) Field of Classification Search .................. 358/1.2, 358/1.5, 1.7, 1.9, 504, 505; 395/109; 250/234–236; 356/399, 401; 355/53, 67
See application file for complete search history.

(56) References Cited

U.S. PATENT DOCUMENTS

| | | | | |
|---|---|---|---|---|
| 5,499,094 A | * | 3/1996 | Swierczek | 356/121 |
| 5,617,132 A | * | 4/1997 | Fisli | 347/235 |
| 5,841,520 A | * | 11/1998 | Taniguchi | 355/53 |
| 5,969,441 A | * | 10/1999 | Loopstra et al. | 310/12 |
| 6,100,978 A | | 8/2000 | Naulleau et al. | 356/498 |
| 6,262,796 B1 | | 7/2001 | Loopstra et al. | 355/53 |
| 6,323,959 B1 | | 11/2001 | Toyama et al. | 382/312 |
| 6,650,699 B1 | | 11/2003 | Tierno et al. | 375/232 |
| 2003/0156184 A1 | | 8/2003 | Suzuki et al. | 347/249 |

FOREIGN PATENT DOCUMENTS

| | | |
|---|---|---|
| KR | 2001-13427 | 2/2001 |
| WO | WO 98/56164 | 10/1998 |
| WO | WO98/56164 A1 | 12/1998 |

* cited by examiner

*Primary Examiner*—Edward L. Coles
*Assistant Examiner*—Negussie Worku
(74) *Attorney, Agent, or Firm*—DLA Piper US LLP

(57) ABSTRACT

Linear spot velocity or position variations are measured in a scanning system by a process and apparatus. The process comprises providing at least two radiation detectors that can move in tandem across a scan line, the two radiation detectors being spaced apart by a distance d; positioning the at least two radiation detectors at a first point on the scan line; scanning the at least two radiation detectors with scanning radiation and recording the position of the two detectors along the scan line and the time taken for the scanning radiation to scan from a first of the at least two radiation detectors to a second of the at least two radiation detectors while the at least two radiation detectors are positioned at the first point; moving the at least two radiation detectors to a second point on the scan line maintaining the distance d between the at least two radiation detectors; and again scanning the at least two radiation detectors with scanning radiation and recording the position of the two detectors along the scan line and the time taken for the scanning radiation to scan from a first of the at least two radiation detectors to a second of the at least two radiation detectors while the at least two radiation detectors are positioned at the second point.

14 Claims, 12 Drawing Sheets

Figure 1—PRIOR ART

SCANNER LINEARITY TESTER

BACKGROUND OF THE INVENTION

1. Field of the Inventions

This invention relates to the field of imaging, particularly to the field of digital imaging, to the field of scanning images with a collimated beam of radiation and more particularly to the correction of lens-induced aberrations in the scanning process.

2. Background of the Art

The use of digital imaging has become extremely successful in a wide area of technical fields. In addition to the use of light beams (e.g., collimated light beams such as lasers) to directly image such diverse media as photographic elements, photothermographic elements, thermal mass transfer carriers, ablation-based systems, and the like), lasers are quite efficient in the rapid imaging of intermediate substrates that can be subsequently treated to provide images. Such intermediate imaging systems include, by way of non-limiting examples, electrography, photoelectrography, photolithography, photoconductive systems, and the like.

The use of lasers in digital systems is particularly effective as the lasers themselves generate spots (the incident areas of the laser beams), and as the lasers are effectively pulsed, the spots can be used to form pixels. Each spot can theoretically be a pixel (the smallest consistent repeating element of a picture, i.e., picture element), but ordinarily, the spots are small and numerous spots are used to create a pixel on even fairly high resolution images.

The accuracy of spot placement (and hence the resolution of pixel placement) is dependent upon a number of technical features, including especially the accuracy of the physical control of the positioning of the radiation beam on the focal plane. Among the technical features that contribute to this accuracy are software, mechanical components (moving the beam or the receiving surface), stability of mechanical components (avoiding vibration, reduced wear and the like), and the accuracy and quality of the beam of radiation itself. The last feature, beam quality, is particularly affected by the quality of the lens used in directing the laser beam. For the sake of simplicity in the discussion of this invention, the entire projection system may hereinafter be referred to as the "lens." However, the term lens should be broadly interpreted as encompassing various types of projection systems, including refractive optics, reflective optics, and catadioptric systems, for example. The radiation system may also include components operating according to any of these design types for directing, shaping or controlling the projection beam of radiation, and such components may also be referred to below, collectively or singularly, as a lens. The position of a second element traversed by the projection beam relative to a first element traversed by the projection beam will for simplicity hereinafter be referred to as "downstream" of or "upstream" of said first element. In this context, the expression "downstream" indicates that a displacement from the first element to the second element is a displacement along the direction of propagation of the projection beam; similarly, "upstream" indicates that a displacement from the first element to the second element is a displacement opposite to the direction of propagation of the projection beam. Further, the lithographic apparatus may be of a type having two or more substrate tables (and/or two or more mask tables). In such "multiple stage" devices the additional tables may be used in parallel, or preparatory steps may be carried out on one or more tables while one or more other tables are being used for exposures. Dual stage lithographic apparatus are described, for example, in U.S. Pat. No. 5,969,441 and WO 98/40791, incorporated herein by reference.

In a manufacturing process using a lithographic projection apparatus, a pattern (e.g. in a mask) is imaged onto a substrate that is at least partially covered by a layer of radiation-sensitive material (resist). Prior to this imaging step, the substrate may undergo various procedures, such as printing, resist coating and a soft bake. After exposure, the substrate may be subjected to other procedures, such as a post-exposure bake, development, a hard bake and measurement/inspection of the imaged features. This array of procedures is used as a basis to pattern an individual layer of a device, e.g. an integrated circuit (IC). Such a patterned layer may then undergo various processes such as etching, ion-implantation (doping), metallization, oxidation, chemo-mechanical polishing, etc., all intended to finish off an individual layer. If several layers are required, then the whole procedure, or a variant thereof, will have to be repeated for each new layer. Eventually, an array of devices will be present on the substrate (wafer). These devices are then separated from one another by a technique such as dicing or sawing, whence the individual devices can be mounted on a carrier, connected to pins, etc. Further information regarding such processes can be obtained, for example, from the book "Microchip Fabrication: A Practical Guide to Semiconductor Processing", Third Edition, by Peter van Zant, McGraw Hill Publishing Co., 1997, ISBN 0-07-067250-4, incorporated herein by reference.

There is a desire to integrate an ever-increasing number of electronic components in an IC. To realize this it is necessary to decrease the size of the components and therefore to increase the resolution of the projection system, so that increasingly smaller details, or line widths, can be projected on a target portion of the substrate. For the projection system this means that the projection system and the lens elements used in the projection system must comply with very stringent quality requirements. Despite the great care taken during the manufacturing of lens elements and the projection system they both may still suffer from wave front aberrations, such as, for example, displacement, defocus, astigmatism, coma and spherical aberration across an image field projected with the projection system onto a target portion of the substrate. Said aberrations are important sources of variations of the imaged line widths occurring across the image field. It is important that the imaged line widths at different points within the image field are constant. If the line width variation is large, the substrate on which the image field is projected may be rejected during a quality inspection of the substrate. Using techniques such as phase-shifting masks, or off-axis illumination, the influence of wave front aberrations on the imaged line widths may further increase.

During manufacture of a lens element it is advantageous to measure the wave front aberrations of the lens element and to use the measured results to tune the aberrations in this element or even to reject this element if the quality is not sufficient. When lens elements are put together to form the projection system it may again be necessary to measure the wave front aberrations of the projection system. These measurements may be used to adjust the position of certain lens elements in the projection system in order to minimize wave front aberrations of the projection system.

After the projection system has been built into a lithographic projection apparatus, the wave front aberrations may be measured again. Moreover, since wave front aberrations are variable in time in a projection system, for instance, due to deterioration of the lens material or lens heating effects local heating of the lens material), it may be necessary to measure the aberrations at certain instants in time during operation of the apparatus and to adjust certain movable lens elements accordingly to minimize wave front aberrations. The short time scale, on which lens-heating effects may occur, may require measuring the wave front aberrations frequently.

The use of an interferometric measurement system for in-situ measurement of wave front aberrations of the projection system of a lithographic projection apparatus is described in P. Venkataraman, et al., "Aberrations of steppers using Phase Shifting Point Diffraction Interferometry", in Optical Microlithography XIII, J. Progler, Editor, Proceedings of SPIE Vol. 4000, 1245-1249 (2000). A Phase Shifting Point Diffraction Interferometry method and a corresponding system are disclosed in P. P. Naulleau et al., U.S. Pat. No. 6,100,978, issued Aug. 8, 2000, incorporated herein by reference. The Phase Shifting Point Diffraction Interferometry measurement method and corresponding measurement system will be referred to hereinafter as the PSPDI method and PSPDI system, respectively. The disclosed PSPDI systems feature the following elements, mentioned here in the order wherein these elements are traversed by the projection beam: a first pinhole in an object plane; a grating (with a one dimensional periodic structure of lines and spaces) between the object plane and the projection system, for generating by diffraction a test beam and a reference beam; the projection system, and a set of two pinholes comprising a window pinhole (traversed by the test beam) and a reference pinhole (traversed by the reference beam, and acting as a spatial filter for generating an unaberrated reference beam) in the plane that is optically conjugate to the object plane. The test beam and the reference beam generate an interference fringe pattern on a detector surface downstream of the set of two pinholes. This interference fringe pattern carries information on wave front aberrations. The grating, generally embodied as a grating pattern on a plane surface of a carrier substrate, acts as a beamsplitter; the grating shall be located downstream of said object plane such as to provide sufficient lateral separation of the areas traversed by the reference beam and the test beam in the plane that is optically conjugate to the object plane. Further, the grating is movable in a direction perpendicular to the direction of propagation of the projection beam such as to provide "phase shifting" (as explained below) of the interference fringe pattern with respect to a coordinate system associated with the detector surface, as needed for measuring aberrations.

Said phase shifting of the interference fringe pattern involves shifting the interference fringe pattern with respect to said coordinate system. For an explanation of "phase shifting" in relation to interferometry see, for example, D. Malacara, "Optical Shop Testing", John Wiley & Sons, Inc., New York, second edition. Movement of an optical element (such as, for example, a grating) to provide phase shifting will be referred to hereinafter as "phase stepping". A finite movement of an optical element (such as, for example, a grating) to provide a finite phase shift of said interference fringe pattern will be referred to hereinafter as a "phase step".

An embodiment of a PSPDI system in a lithographic projection apparatus comprises, besides the support structure for supporting patterning structure and the substrate table for holding a substrate, one or more dedicated, movable support structures for supporting the grating and/or for moving the grating into and out of the projection beam and/or for phase stepping the grating. Incorporation of these one or more dedicated support structures into the lithographic projection apparatus leads to added mechanical complexity and increased costs of manufacturing the lithographic projection apparatus. Further, as explained above, in a PSPDI system each individual beam (the test beam and the reference beam) impinging on the detector has traversed two pinholes, one pinhole upstream of the projection system, and one pinhole downstream of the projection system. This circumstance typical for a PSPDI system poses a limitation to the amount of radiation that may reach the detector, and hence, to the sensitivity of the measurement system. U.S. Pat. No. 6,650,699 addresses these problems in a lithographic projection apparatus including an illumination system; a support structure for holding a mask; a substrate table for holding a substrate; a projection system for projecting a pattern onto a target portion of the substrate; and an interferometric measurement system for measuring wave front aberrations of the projection system, characterized in that the interferometric measurement system including: a grating, featuring a grating pattern in a grating plane, the grating being movable into and out of the projection beam, such that the grating plane is substantially coincident with the object plane; a pinhole, featuring a pinhole pattern in a pinhole plane and arranged in a pinhole plate, the pinhole being movable into and out of the projection beam, such that the pinhole plane is substantially coincident with a plane downstream of the projection system and optically conjugate to the object plane, and a detector with a detector surface substantially coincident with a detection plane, the detection plane located downstream of the pinhole at a location where a spatial distribution of the electric field amplitude of the projection beam is substantially a Fourier transformation of a spatial distribution of the electric field amplitude of the projection beam in the pinhole plane.

U.S. Pat. No. 6,323,959 (Toyama et al.) describes an image processor that receives color image data and converts them to image data of cyan, magenta, yellow and black aberration correction, and various image data processing is performed on the image data after the color aberration necessary for image forming. The received color image data are subjected to color correction in order to improve the precision of image processing on a color document image. The image data processing includes, for example, a specified color document is decided, automatic color selection and magnification change. The system operates by using a color image sensor which outputs image signals in correspondence to a plurality of colors; an optical system which focuses an image optically onto said color image sensor; a color aberration corrector which corrects image signals received from said color image sensor to cancel a displacement of focal point of the optical images of the colors caused by color aberration of said optical system; and a magnification changer which changes a magnification power of the image signals corrected by said color aberration corrector. This is primarily an attempt to correct chroma aberration induced by an optical lens, a phase difference among R, G and B is larger at positions closer to the ends of a document in the main scan direction.

When printing color images with an electrophotographic imaging system, there are usually four different monochrome colors that need to be combined into one full color print. The subtractive primary colors normally used in this process are cyan, magenta and yellow. Because the "process" black formed by combining all three primary colors is not usually an acceptable black, a fourth color (black) is normally used and the full color printing machine prints in cyan, magenta, yellow and black (C, M, Y and K).

In most color printing systems, a tandem approach is used whereby four separately produced monochrome images are combined (hopefully in good registration) to form the full color print. Each of the four primary images may be formed with the same scanning device (a 4-pass system) or each may be formed using a separate scanner (4 scanners for 4 color images) in which case the system is called a 1-pass system.

When different scanners are used (as in the 1-pass system) care must be taken to ensure that all four scanners are alike in their imaging character. Specifically, the focused spot of each of the four scanners must travel along the scan path in an identical (or near identical) manner which means that the velocity of the spot is constant in all scanners or that the velocity variations of the spot traveling along the scan are identical for all four scanners.

For example, if the yellow monochrome image is recorded with a perfectly linear scanner (spot velocity constant along the scan) but the cyan image is recorded with a scanner whose spot velocity is not so constant, then there will be areas in the color print where the yellow image and the cyan image are mis-registered and associated areas where the yellow image and the cyan image are well registered. It is of interest, therefore, to know about a scanner's spot velocity along its scan line and, more specifically, to know exactly where each pixel will be written in the presence of scanner non-linearities.

One commonly used method for determining scanner linearity behavior is to write an image onto a receptor material (such as paper) and then measure the image to determine if all the pixels along the scan line are properly placed or if some of the pixels may not have been placed correctly. These kinds of measurements are tedious and require an entire printing system to produce the measurable print.

The use of high quality glass refractive lenses has been required to minimize the aberrations in systems that require high quality, high resolution images. These lenses are very expensive, especially for mass produced imaging systems. However, when plastic lenses are used, the degree of aberration produced is extremely significant. It is not unusual to find pixel displacements of 5-10 pixel dimensions in actual images. This is unacceptable for high quality images, but has been used to make systems cost effective in markets that have become cost competitive, as in electrophotographic imaging systems.

SUMMARY OF THE INVENTION

A method for measuring the linearity of spot and associated pixel placement error along a scan line comprises moving at least two split detectors along a scan line of a scanner (with the lens in place) and using the known and preferably fixed physical relationship (e.g., separation) to map the location of spots and/or pixels in response to expected locations based on image data input, correlating the actual locations with the expected location along the entire scan line, and providing a basis for providing appropriately located spots on the scan line in subsequent imaging by converting raw data into converted scan input data that will provide spots in actual intended locations.

DETAILED DESCRIPTION OF THE INVENTION

Figure 1:
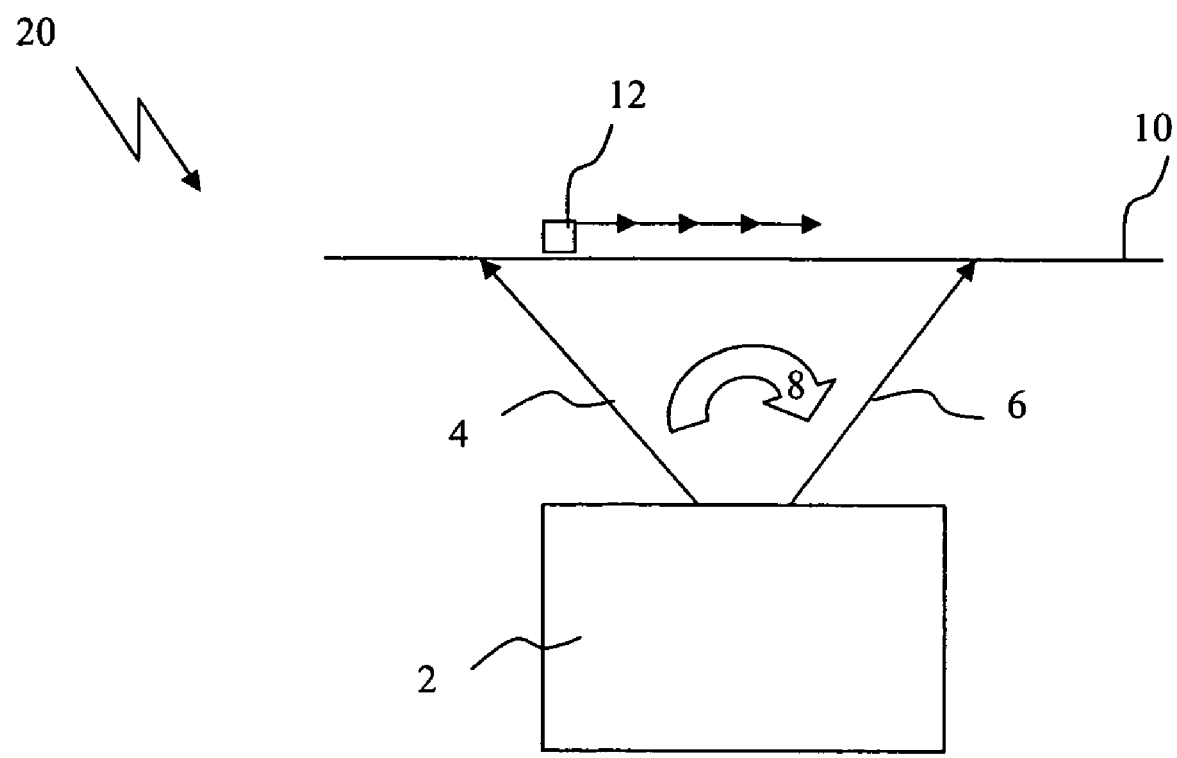
FIG. 1 shows a prior art measurement system with a single scanner used to provide a mapping of scanner signals as a function of time.

It is important to appreciate that with a single lens system, the deviations in pixel positions (given non-varying or non-defective input parameters) tends to be primarily a result of lens imperfections, especially as less exacting polymeric lenses or less polished glass lenses are used. The lenses are also relatively stable within the imaging systems, so that once a lens is fixed within the imaging system, the deviations in pixel positioning are relatively constant. That is, if a pixel is intended for a graph position (x, y) and the actual result of positioning is (x', y') on a first occasion, the result of an intended graph position (x, y) will result in a resulting positioning of (x', y') on a second occasion. The critical complexity is in creating a precise map of resulting positions versus intended positions for essentially all possible imaging sites (spot location) along the scan line, and then producing a map of actual scan directed spots or pixels that will produce a spot or pixel in the intended position. The use of a single detector does not provide efficient, consistent and accurate results. It is of interest to note that the use of multiple detectors in the present invention does not merely multiply the available data by two to produce improved results, but generates a different type of data that can be more accurately and readily translated into a data base, program, look-up table or the like that can be used to provide accurate positioning of spots along a scan line.

A method for measuring linear spot velocity or position variations in a scanning system according to the invention may comprise:

a) providing at least two radiation detectors that can move in tandem across a scan line, (the detectors may, by way of non-limiting example, be spaced apart by a distance or fixed distance d by being carried on a fixed support or platform);

b) positioning the at least two radiation detectors at a first point on the scan line;

c) scanning the at least two radiation detectors with scanning radiation (to which the detectors are sensitive or may measure and/or detect) and recording the position of the two detectors along the scan line and the time taken for the scanning radiation to scan from a first of the at least two radiation detectors to a second of the at least two radiation detectors while the at least two radiation detectors are positioned at the first point;

d) moving the at least two radiation detectors to a second point on the scan line maintaining the distance d between the at least two radiation detectors; and e) again scanning the at least two radiation detectors with scanning radiation and recording the position of the two detectors along the scan line and the time taken for the scanning radiation to scan from a first of the at least two radiation detectors to a second of the at least two radiation detectors while the at least two radiation detectors are positioned at the second point. The method generally may repeat steps d) and e) across the scan line to create data for the entire scan line. The method can be used, among other end results, to provide an electronic look-up table identifying spot velocity error (or any other spot positioning error or their equivalents) as a function of spot position along the scan line. The method may use a trend line to determine or correct data to be put into an electronic look-up table to identify data errors from sources other than lens aberrations. The trend line may be used to correct data before the data is placed into the look-up table. In one preferred embodiment, the at least two detectors comprise two split detectors that are moved while supported on a rigid platform. In a convenient practice of the invention, the distance between the first point and the second point is approximately d. The recorded information is, by way of non-limiting examples, used to determine a perspective, graph or table of spot placement error along the scan line for a particular lens used in the scanning system. The recorded information for one lens may be compared with recorded information for at least one other lens. Lenses that are compared may be selected or rejected for combination into a multi-color tandem scanning imaging system based on similarity of optical performance.

An apparatus is also disclosed for the measurement of linear pixel displacement error in a scanning system comprising:

a scanning source that provides scan radiation along a scan line;

at least two radiation detectors that can move in tandem across a scan line, the two radiation detectors being spaced apart by a distance d; and a processor (e.g., microprocessor, installed microprocessor, distal computer, etc.) that collects detection data from the at least two radiation detectors. The apparatus may provide the at least two radiation detectors as at least two split detectors. The use of multiple detectors beyond two is not necessary, but can provide additional results, especially if they are in-line with the at least two detectors or where one other detector is out-of-line by a predetermined amount. The apparatus may provide the processor with a program that can modify the detection data for spot positioning defects in the data that are contributed by effects other than lens aberration. The system, apparatus and method is particularly advantageous for use with a scanning system wherein scan radiation is passed through a lens before it reaches a focal plane for the scan line.

Reference to a prior art measurement system 20 in FIG. 1 will assist in appreciating the differences of the present invention from the prior art and understanding how the system of the invention performs. System 20 in FIG. 1 comprises a scanner 2, a left extreme laser scan beam 4, a right extreme laser scan beam 6, a scan range angle 8, a scan line 10 and a single detector 12. Measurement of scanner 2 linearity is performed by triggering the measurement system 20 with a start-of-line signal (e.g., generated at or before extreme left scan beam 4), and moving the detector 12 along the scan line 10 in small increments. The detector keeps track of the focused spot travel time between the start-of-line signal and the detector 12 as the detector 12 is moved along the scan line 10. This provides information about pixel placement error along the scan line 10. The advantage of this system is that no print needs to be recorded and provided for the measurement. The disadvantage of this method is that the actual position of the detecting element must be known within a fraction of a pixel at all points along the scan line, or else the data collected will not be an accurate representation of the actual scanner linearity signal.

Figure 2:
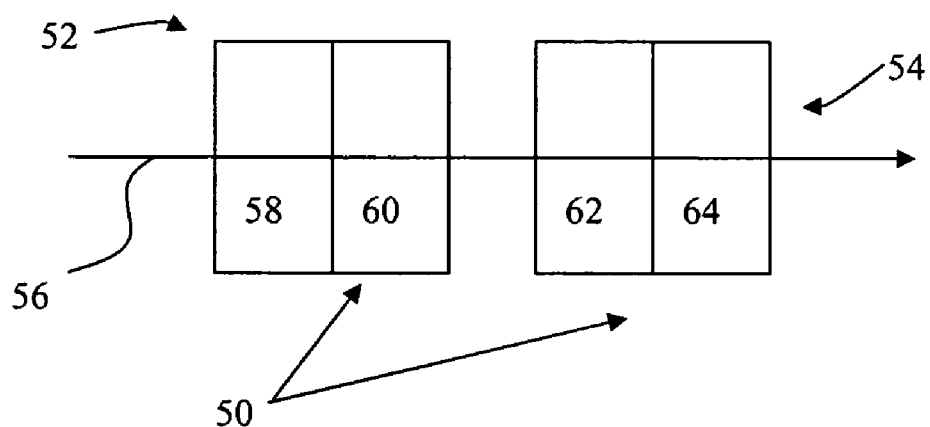
FIG. 2 shows a pair of split detectors positioned along a scan line.

A scanner linearity measurement system according to the present invention uses at least two detectors, such as the split detectors 54 and 52 shown in the detector system (or detecting head) 50 of FIG. 2. The two detectors 52 and 54 are distributed and move along the scan line 56. Detector 52 is shown as a split detector with first detecting sub-element 58 adjacent to second detecting sub-element 60. Detector 54 is shown as a split detector with first detecting sub-element 62 adjacent to second detecting sub-element 64.

Figure 3:
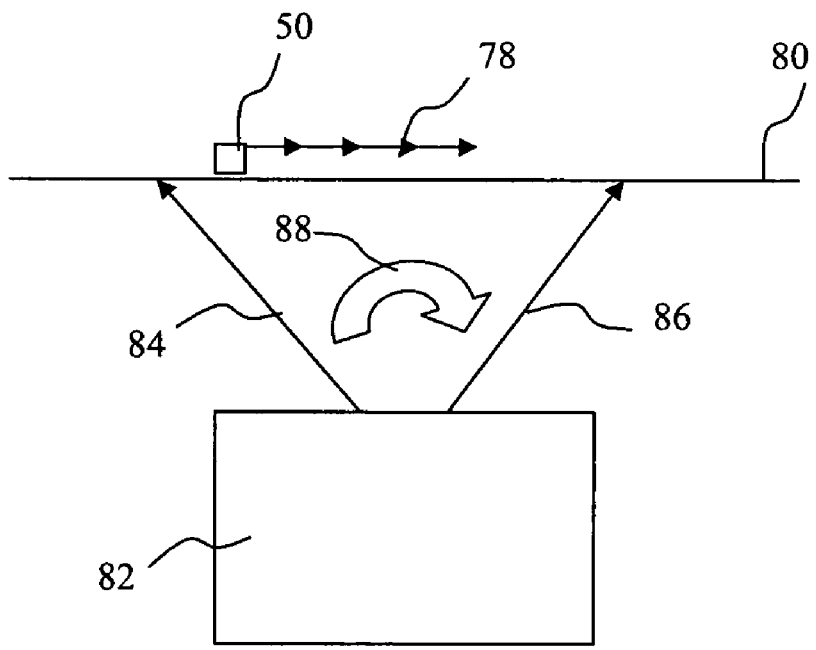
FIG. 3 shows the movement of a pair of split detectors along a scan line in a measurement system of the present invention.

FIG. 3 shows the positioning of the detecting head 50 along the scan line 80 along which the laser scans in direction 78. System 50 in FIG. 2 comprises a scanner 82, a left extreme laser scan beam 84, a right extreme laser scan beam 86, a scan range angle 88, a scan line 80 and a single detecting head 50. Measurement of scanner 82 linearity is performed by moving the detecting head 50 along the scan line 80. The detector head 50 is placed in the best focus position (along the focal plane) of the scan line 80 and indexed along the scan line 80 in increments that are roughly equal to the spacing between the detectors. Other increments may be used and incorporated into the calculation of data.

The detecting head is stopped at preprogrammed positions, with each of the detectors at known intervals (this most easily accomplished by having the two detectors on a rigid platform that moves along the scan line). At each of these preprogrammed positions, the average transit time for the spot to move from detector 1 (52) to detector 2 (54) is measured and recorded. In an example of the measuring system of the invention, the detectors were placed 5.5 mm apart (inside edge to inside edge) and the detecting head was moved 5.5 mm each time a measurement was recorded. A total of 34 data points were measured and recorded along a 187 mm scan line. The raw data is shown in Table 1, with columns 1 and 3 being the distance position along the scan line and columns 2 and 4 being the elapsed time from detector 1 to detector 2 in microseconds.

TABLE 1

| Distance (inches) | Time (μsec) | Distance (inches) | Time (μsec) |
|---|---|---|---|
| 0 | 0 | | |
| 0.2225 | 13.196 | | |
| 0.445 | 13.314 | 4.005 | 13.104 |
| 0.6675 | 13.367 | 4.2275 | 13.098 |
| 0.89 | 13.339 | 4.45 | 13.111 |
| 1.125 | 13.275 | 4.6725 | 13.109 |
| 1.335 | 13.233 | 4.895 | 13.087 |
| 1.5575 | 13.22 | 5.1175 | 13.05 |
| 1.78 | 13.228 | 5.34 | 12.997 |
| 2.0025 | 13.247 | 5.5625 | 12.921 |
| 2.225 | 13.273 | 5.785 | 12.852 |
| 2.4475 | 13.298 | 6.0075 | 12.795 |
| 2.67 | 13.31 | 6.23 | 12.752 |
| 2.8925 | 13.301 | 6.4525 | 12.738 |
| 3.115 | 13.265 | 6.675 | 12.743 |
| 3.3375 | 31.211 | 6.8975 | 12.766 |
| 3.56 | 13.16 | 7.12 | 12.771 |
| 3.7825 | 13.13 | 7.3425 | 12.704 |

Figure 4:
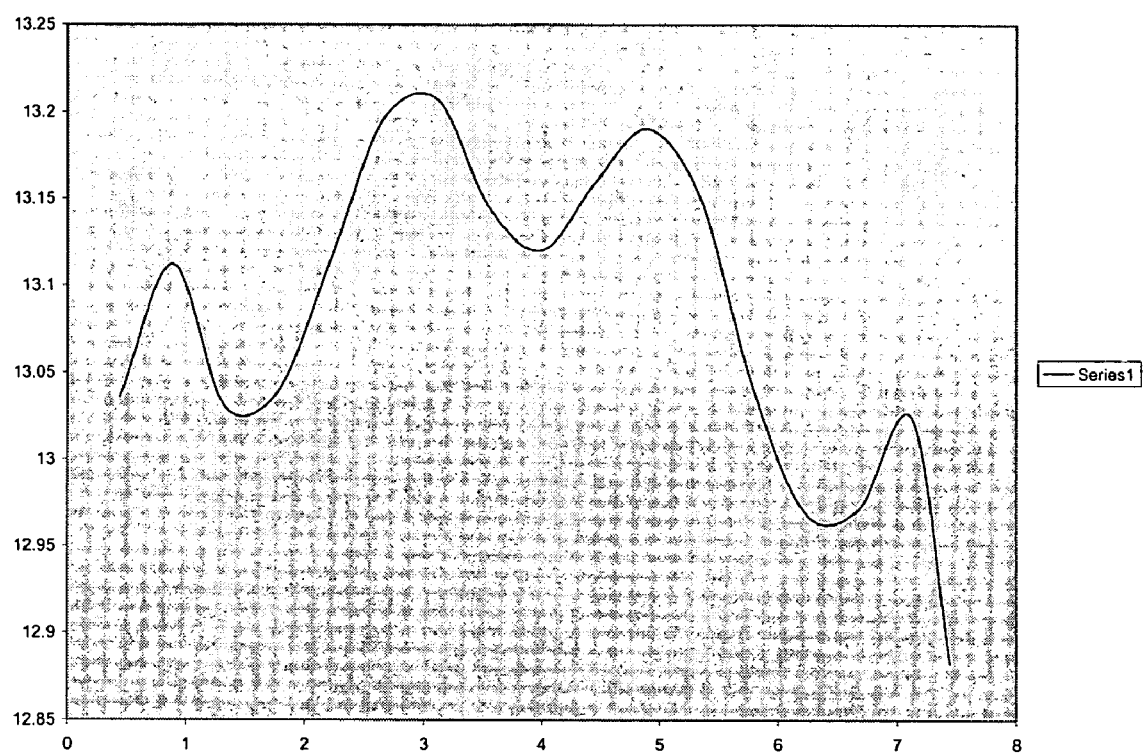
FIG. 4 shows a graph of velocity of the scan across the focal line (scan line) as a function of the pixel position.

A plot of this data is shown in FIG. 4. In theory, a perfect scanner would have produced uniformly identical time measurements, indicating that the time for the scanner to move from point 1 (detector 1) to point 2 (detector 2) was identical, or a linearly decreasing or increasing time value if the detectors did not perfectly move along the focus plane, which it should be because of the fixed and constant spacing between the two detectors. In this case, at least because of aberrations in the scanner lens, the scanner exhibits significant variation in accuracy (as measured by velocity between two points) along the scan line. A perfect linear scanner would have produced data that would be graphed as a horizontal straight line.

Figure 5:
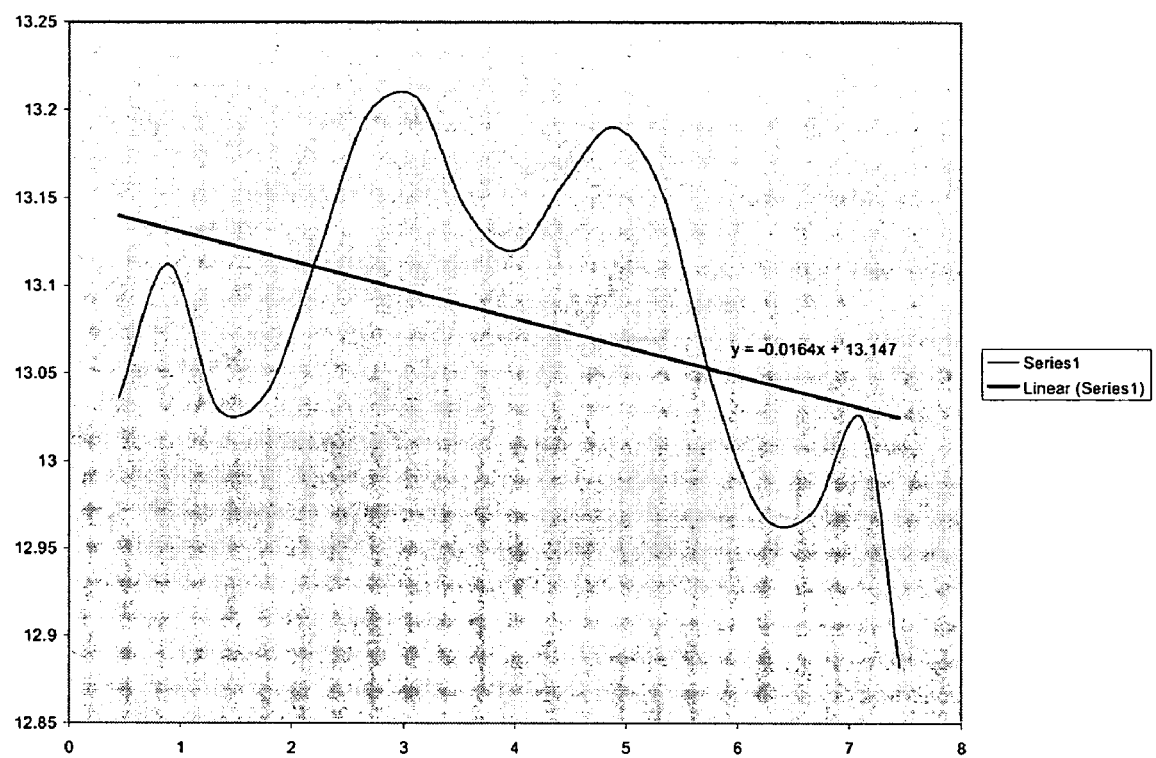
FIG. 5 shows an imposed trend line on the graph of FIG. 4.
Figure 6:
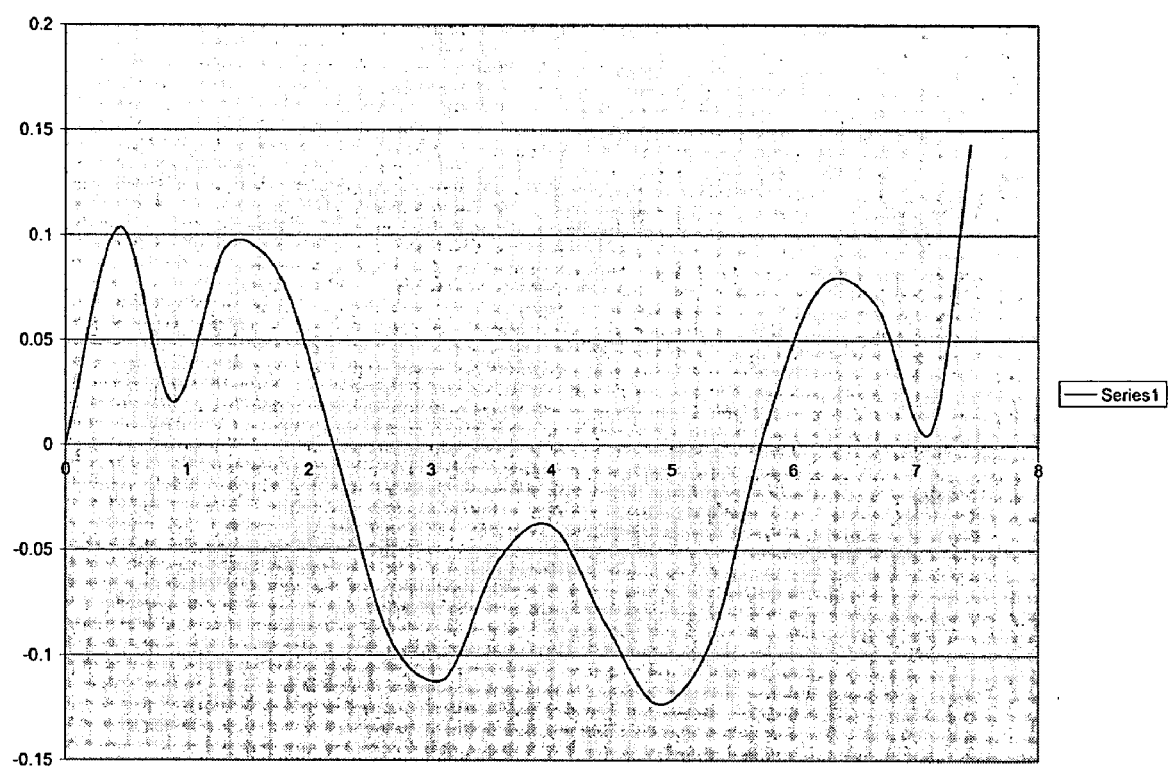
FIG. 6 shows a rationalized graph of velocity of the scan line as a function of pixel position.

To eliminate any measurement error introduced by the measurement systems (e.g., such as by detector movement that was not exactly parallel to the scan line or detector alignment skewed with respect to the scan line), a trend line may be mathematically computed. For example, FIG. 5 shows a trend line created by Excel® software programs (executing an algorithm generating a linear trendline equation y=−0.0164x+13.147, although with software operation and software execution of corrections, non-liner, i.e., exponential correction functions or trendlines may be provided). It can be seen that the trend line is not horizontal (which it must be, as the trend line must average out to essentially a horizontal straight line). It can therefore be assumed that the measurement system has imposed some error into the data set. To correct this condition (if necessary), the trend line data is merely subtracted from the raw data on a point by point basis. When this trend line adjustment is complete by subtracting the trend line values, the resultant plot shown in FIG. 6 is provided. Because of the way in which the trend line data is created, the area under the curve above the x axis must be equal to the area under the curve under the x axis.

As shown by this data, in the operation of the commercial scanning system and lens used, in actual operation there will be many pixels misplaced along the scan line because of aberrations in the lens system which is equated to the spot velocity variations shown in the data. To make this data useful, spot velocity is translated into "pixels of error" by dividing the absolute time values by time per pixel at 600 dots per inch (dpi). This value in our example is 48.6 nanoseconds (ns) per pixel. This data Scan rate=3000 lines/sec.
Scanner duty cycle=70%
Scanner resolution=600 dpi, 8" scan width
Pixels/scan line=8"×611 pixels/inches=4800 pixels
8" Scan time=$\frac{1}{3000} \cdot 1$ ps×0.7=233.33×10$^{-6}$
8" scan time/pixels/scan line=pixel period=48.6×10$^{-9}$ sec]
can then be plotted as cumulative pixels of error vs position along the scan line.

This plot (shown in FIG. 7) is useful in comparing different scanners for their suitability as companion scanners in a single four-color printer. In order to be suitable companions, two scanners must have approximately the same pixel error values (at any given point along the scan) within the specified system registration allowance. If the cumulative error plots for different scanners are virtually identical or fall within predefined ranges of variations, especially along the scan line (e.g., do not vary by more than, for example, ±2 pixels at any spot), they may be considered to be suitably alike to be used in combination in a multicolor printer. The term "suitable companion" lenses or the standard for suitability of "virtually identical" has some dependence upon the ultimate format of the image to be provided and the particular requirement for resolution in that ultimate format. For example, the need for resolution in an overhead projector image for a professional presentation would be far higher than the resolution needed for a child's homemade birthday invitation, so the tolerable variation of resolution in the latter would be higher than the tolerable resolution in the first. However, even given this potential for variable requirements, the decision on selecting compatible lenses for the ultimate format based on a standard of virtually identical can be understood by one skilled in the art. The likely broadest concept of this standard would be selecting lens sets (e.g., two, three or four lenses) where the pixel deviation at any point among the four lenses does not exceed ±4 pixels. For progressively highly resolution needs, the pixel deviation at any point among the four lenses should not exceed ±3 pixels, ±2 pixels, or ±1 pixel.

Figure 7:
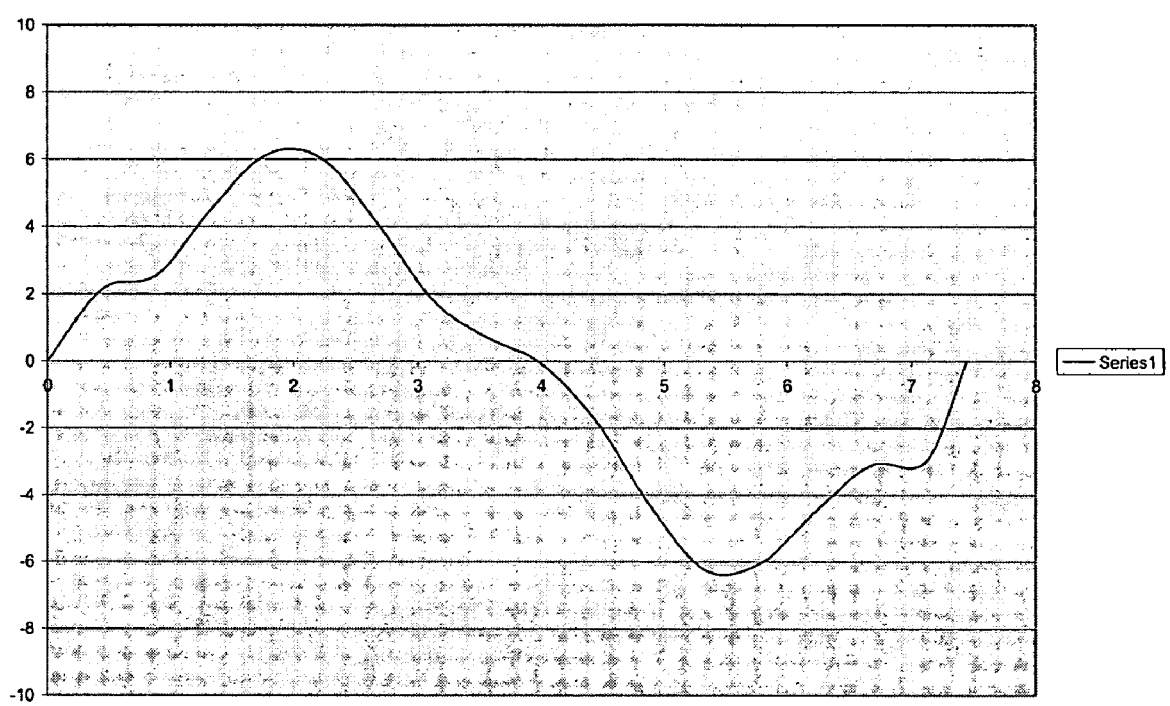
FIG. 7 shows a plot of skewed positions in terms of ±pixel positions with respect to a series of pixels.

The plot in FIG. 7 shows that at a point two inches into the scan, there will be a ±6 pixel placement error of the actually written mark versus the expected results from a perfect linear scanner. These measurements were made without measuring any prints and without the use of any real time reference, such as a start-of-line signal from the scanner.

Figure 8:
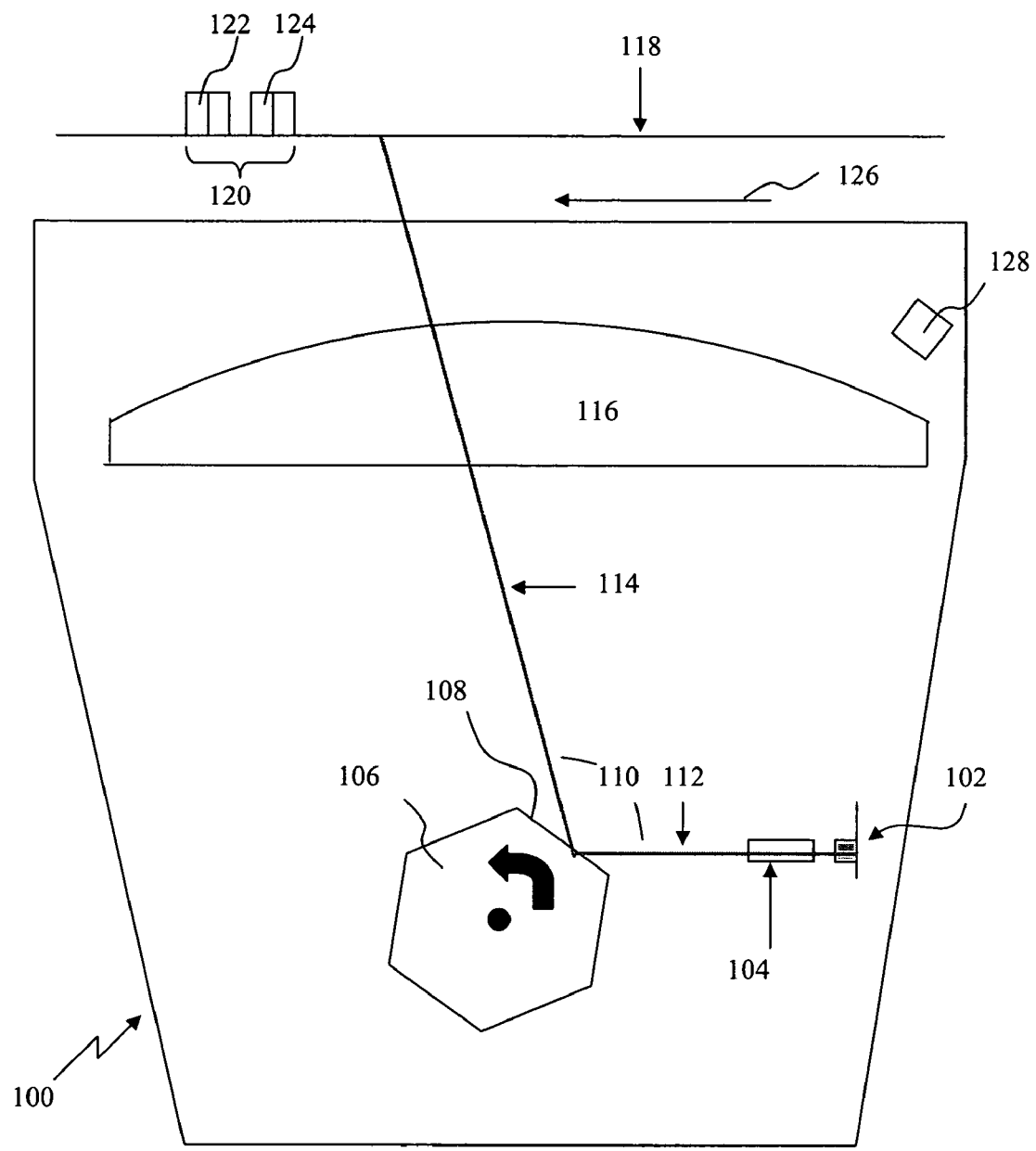
FIG. 8 is a general depiction of laser scanner linearity measurement equipment.

FIG. 8 shows a general schematic of a laser scanner linearity measuring apparatus 100 in one perspective of the present invention. The apparatus 100 comprises a laser source 102, a collimating lens 104, a beam directing element 106 (here shown as a rotating hexagonal mirror) with one surface 108 being struck by the collimated radiation beam 112 and reflected at angle 110 to form the laser scan beam 114. This laser scan beam 114 is further focused by an F theta lens 116 towards the focal plane 118. The detecting head 120 is shown with the two split detectors 122, 124 on the focal plane 118. The scanning direction 126 is also shown. A line synchronization detector 128 is shown. This is a photodiode that senses the position of the laser beam. The signal from the line synchronization detector 128 (which may be after a short delay) initiates the generation of a line of image data to be imposed on the focal plane 118, which is usually a photoreceptor. The generation and placement of the image data is electronically synchronized to the start of line (that is a line of scanning) by an electronic subsystem usually based on a crystal oscillator. The crystal oscillator (not shown) fixes the pixel placement in time as the beam scans across the scan line. This system alone would be sufficient if the spot velocity were always constant across the scan, which it is not because of lens aberrations and other mechanical realities of the apparatus. Due to the imperfections in the apparatus optical system (usually from defects in the F theta lens), the effects of varying the velocity of the spot can produce pixel displacements of up to several pixel dimensions, depending on the scanner's optical quality. The velocity variation of the laser spot is not usually a problem in monochrome (e.g., black only) printers or in multi-pass color printers (where the same laser imaging lens is used on all images). However, in tandem laser color printers using more than one scanner for purposes of recording separate (but overlaid) color images, image misregistration will occur or be amplified if the non-linearity signatures of the different scanners are significantly different. Being able to measure the non-linearity of a given scanner allows like scanners to be selected for equivalent non-linearity, or else it allows for an electronic correction (e.g., software, look-up table, correction table) to be generated for each scanner to make their effective spot placement performance from data similar.

Figure 9:
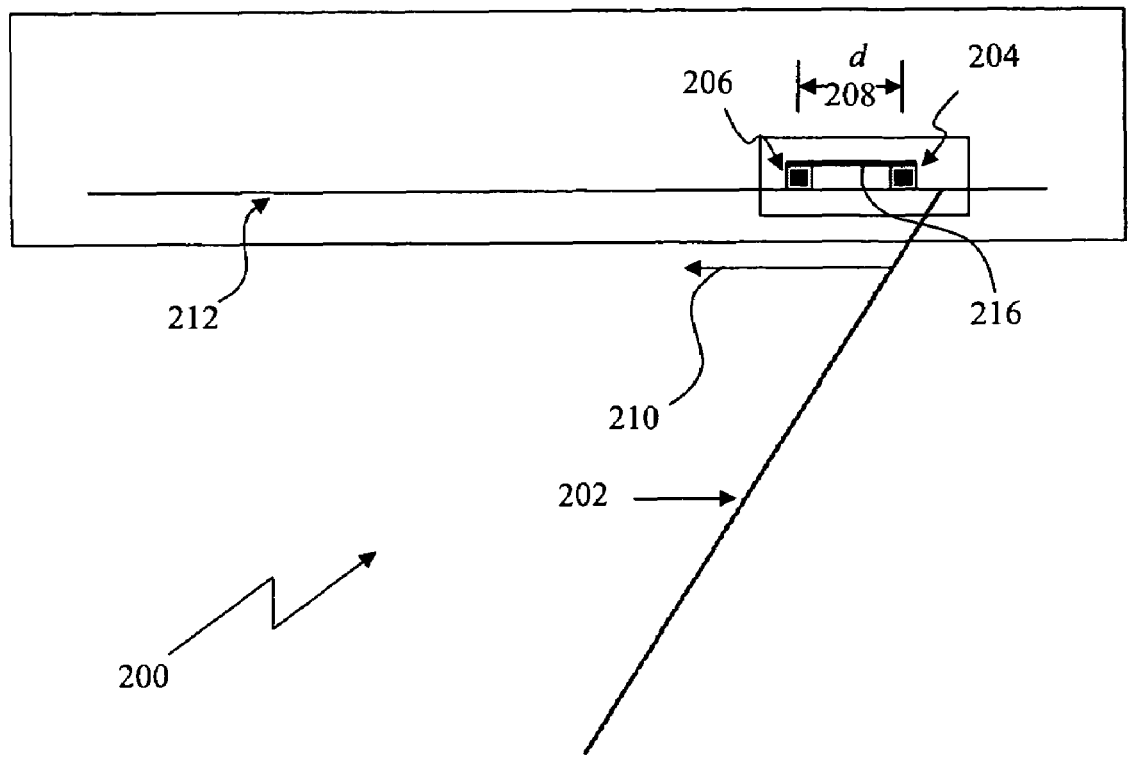
FIG. 9 is a representation of one possible photodetector configuration used in a measurement system according to the invention.

The linearity measurement system 200 is shown in an alternative format in FIG. 9. FIG. 2 shows the laser beam 202 scanning from a right to left direction 210, first crossing over detector 204 and then crossing over detector 206. The time that it takes for the laser beam 202 to move from detector 1 204 to detector 2 206 (distance d, 208) is measured with an electronic counter/timer (not shown) and recorded. The translation stage 216 supporting the two detectors 204 and 206 then moves distance d 208 (other distances may be used, but for simplicity the distance between detectors is also used as the step distance) in the scan direction and the next scan segment time is measured and recorded. At the present time, the distance, d, 208 that the detector platform 218 (and thus both detectors 204, 206) is moved along the scan line focal plane 212 is equal to the spacing between the detectors 204, 206. This sequence of steps (scanning, position detection, and movement of the stage another increment d) is repeated until the entire scan length is measured and recorded. This can be done for each possible spot position available under control of the scanner system, or the system may extrapolate from a reasonable number of these data points (e.g., from 1/10, 1/5, 1/4 or 1/2 the spots deviation in time from the average time of the recorded segments is related to the scanner's non-linearity. To calculate the pixel error, the time deviation of the segments is divided by the pixel clock period to produce the segment errors in pixels. The resulting segment time errors are then plotted or tabulated against time. The first pixel of a scan line (starting position of detector 1 204) is controlled by an adjustable time delay from the line synchronization detector and therefore the error in the first pixel position is or is assumed to be zero for every scan. The above described technique assumes that 1) the translation stage moves the detectors perfectly across the focus plane and 2) there is no rotational skewing of the detectors. These factors may be separately corrected for by mathematic corrections and measurement system adjustments.

Figure 10:
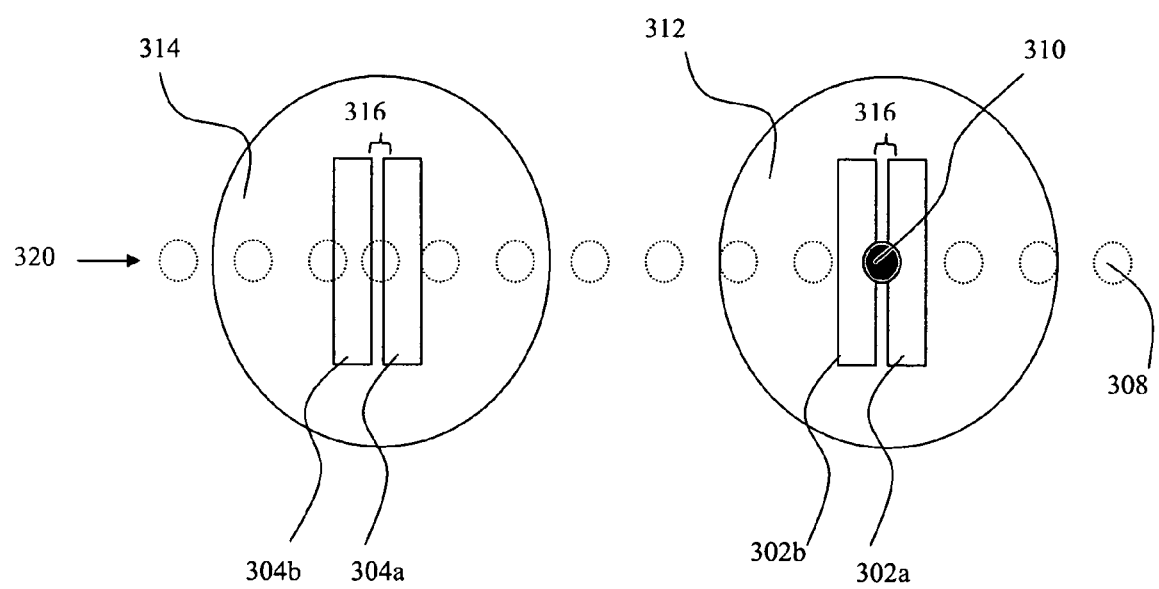
FIG. 10 shows details of split detectors in relationship to individual pixels along a scan line.
Figure 11:
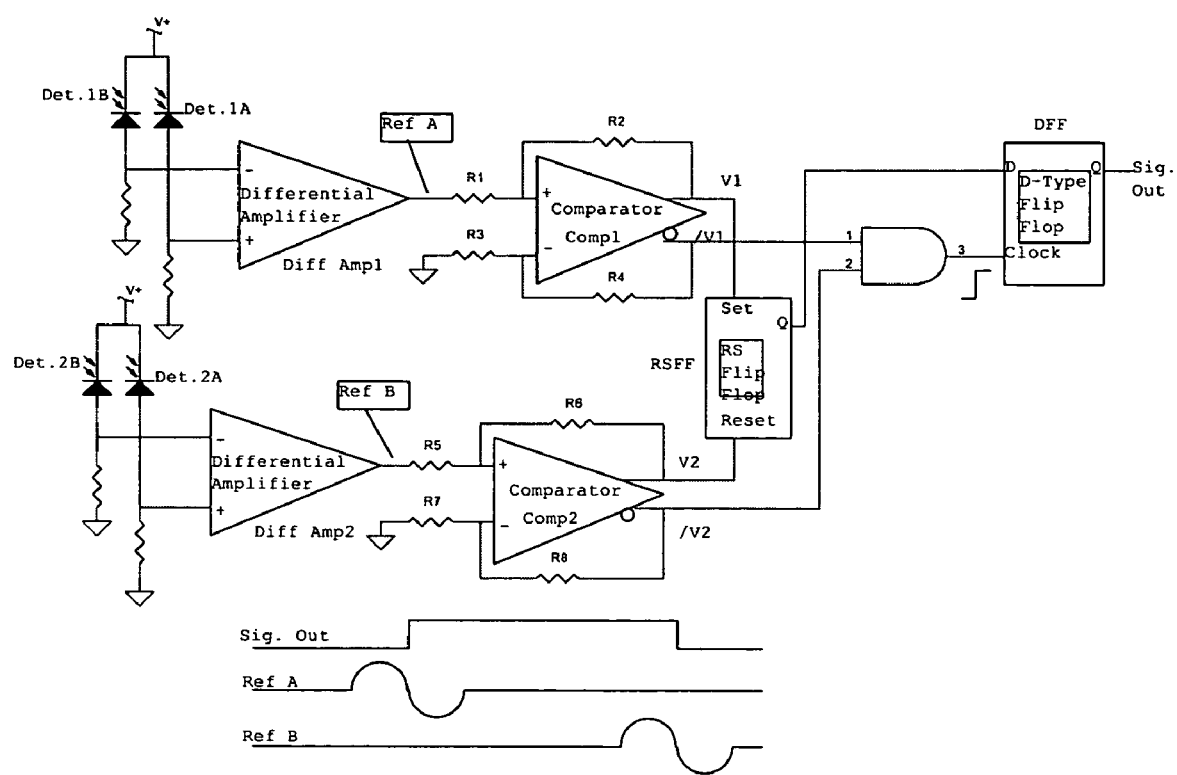
FIG. 11 shows the schematics of a differential amplifier which can be connected to the electronics of a measurement system of the invention.

FIG. 10 shows the two split detectors 312, 314 of the present invention. The associated electronics of one embodiment of the apparatus are shown in FIG. 11. Each split detector 312, 314 is comprised of a pair of individual detectors (302a, 302b) and (304a, 304b). Split detectors were chosen because they can detect laser spot 308 position along a scan line 320 independent of errors caused by laser intensity variations. The only requirement is that the distance 316 between the two halves of each split detector (302a, 302b) and (304a, 304b) is smaller than the diameter of the laser spot 310. In our measurement system split detectors had a separation of about 20 micrometers whereas the laser spot at 600 dpi is about 43 micrometers.

Figure 12:
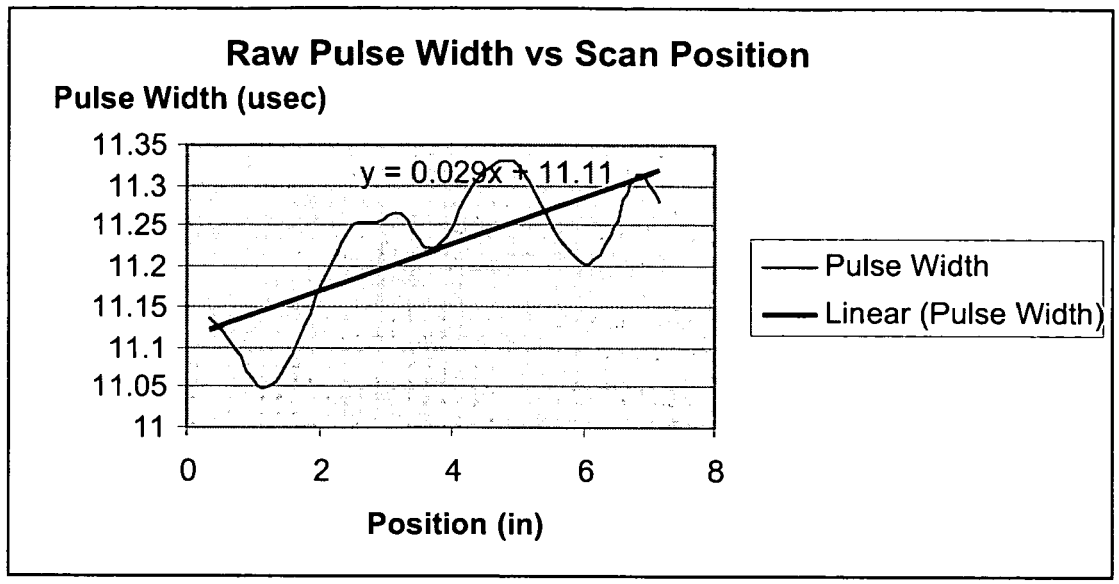
FIG. 12 shows a graphic representation of Pulse Width vs Scan Position derived from measurements taken with the measuring system of the present invention.
Figure 13:
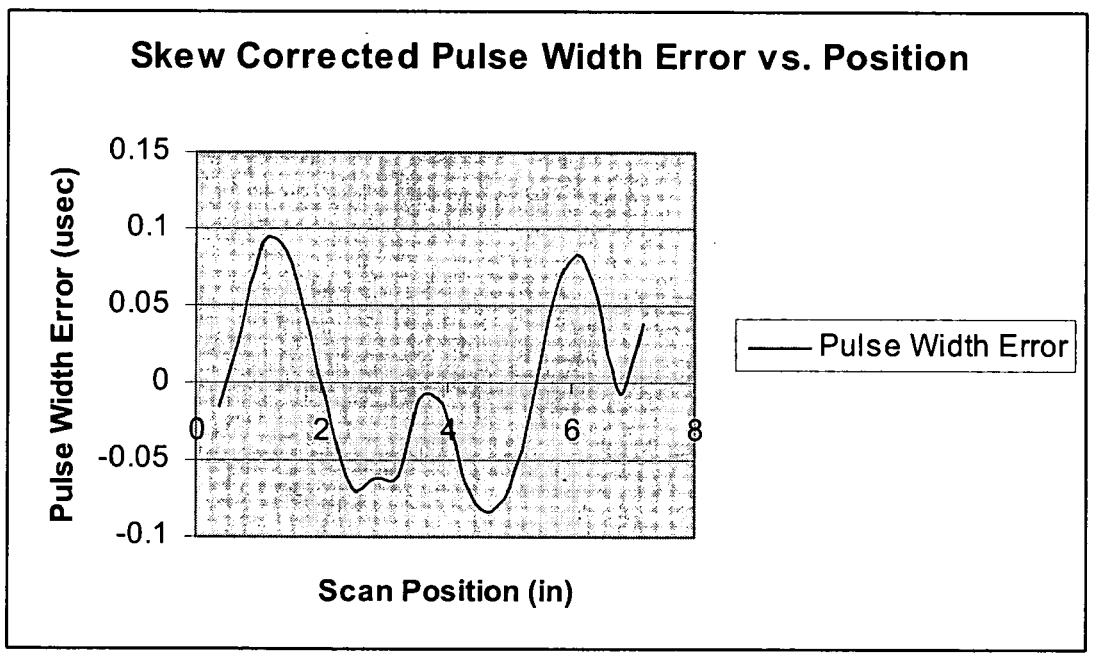
FIG. 13 shows a graphic representation of Skew Corrected Pulse Width Error vs Position.
Figure 14:
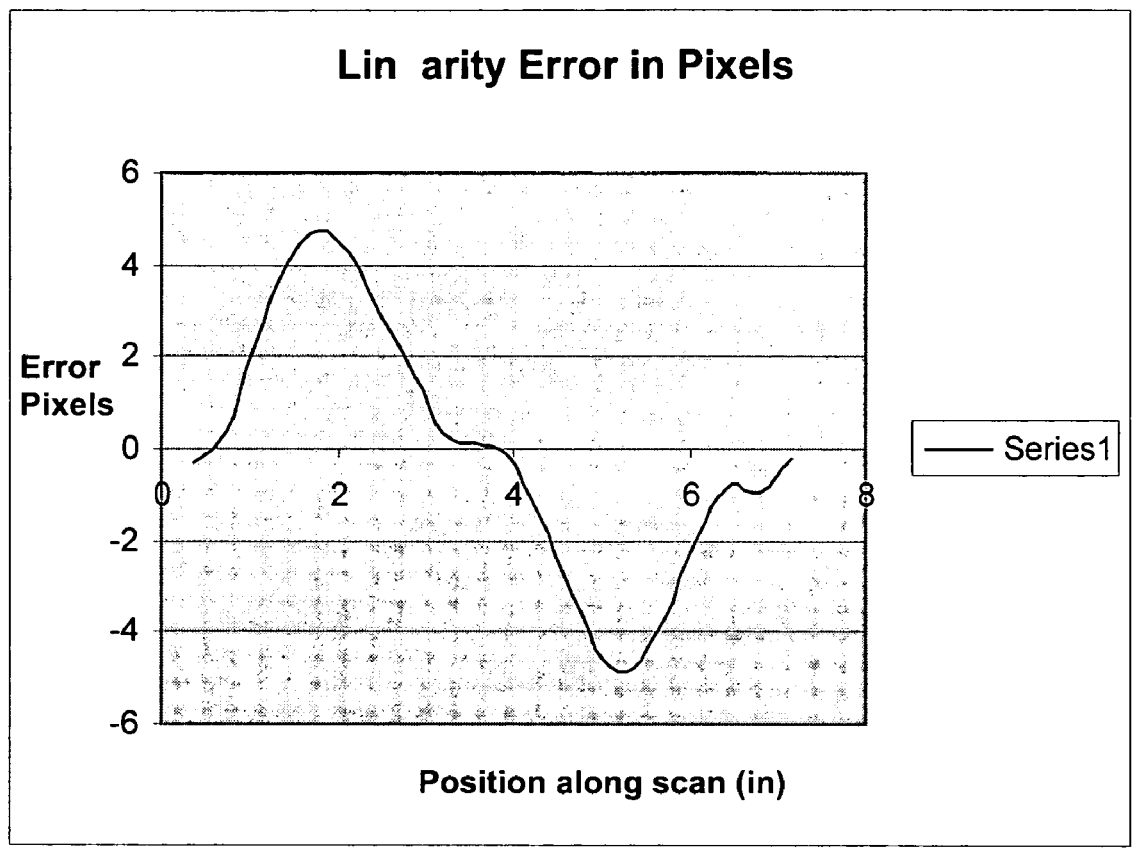
FIG. 14 shows Linearity Error in Pixels as a function of pixel position.

FIG. 12 shows a plot of the measured pulse width vs scan position. The skew of the data was caused by the two source errors 1) and 2) described above. The data was recorded into and plotted with Microsoft Excel® spread sheet program. The linear trend line and its associated equation was generated and plotted by the Excel® program. The trend data line was then subtracted from the actual pulse width graph and the results were plotted as shown in FIG. 13. Finally, the error in pixels was calculated by dividing the value of the pulse width error by the pixel clock period. As this analysis looks at the error with respect to the starting pixel position (which is defined as 0 error), the error is shown as accumulated pixel error. That is, this is a measurement so that if one places pixels along the scan at the pixel frequency, the graph shows how accurately the actual pixel placement is with respect to the theoretically predicted placement in the absence of pixel perturbation. A positive error is defined as placement of a pixel in a position further along the scan line than would be theoretically predicted. FIG. 14 shows a plot of linearity error versus scan position for a scanner that was not optically perfect.

Once the data has been recorded in appropriate units, an electronic look up table or other software can be input to the scanner system to correct for the known optical deficiencies of spot velocity. The table will be compared with each intended spot position to be imaged, and the correction will be applied to each spot direction from the scanner as needed. Depending upon the accuracy and detail in the look-up table, variation in spot velocity across the scan line can be virtually eliminated and always reduced.

What is claimed is:

1. A method for measuring linear spot velocity or spot position variations in a scanning system comprising:
    a) providing at least two radiation detectors that can move in tandem across a scan line, the two radiation detectors being spaced apart by a distance d;
    b) positioning the at least two radiation detectors at a first point on the scan line;
    c) scanning the at least two radiation detectors with scanning radiation and recording the position of the two detectors along the scan line and the time taken for the scanning radiation to scan from a first of the at least two radiation detectors to a second of the at least two radiation detectors while the at least two radiation detectors are positioned at the first point;
    d) moving the at least two radiation detectors to a second point on the scan line maintaining the distance d between the at least two radiation detectors; and
    e) again scanning the at least two radiation detectors with scanning radiation and recording the position of the two detectors along the scan line and the time taken for the scanning radiation to scan from a first of the at least two radiation detectors to a second of the at least two radiation detectors while the at least two radiation detectors are positioned at the second point.

2. The method of claim 1 wherein an electronic look-up table is provided identifying spot velocity error as a function of spot position along the scan line.

3. The method of claim 1 wherein steps d) and e) are repeated across the scan line.

4. The method of claim 3 wherein the at least two detectors comprise two split detectors that are moved while supported on a rigid platform.

5. The method of claim 3 wherein the distance between the first point and the second point is approximately d.

6. The method of claim 3 wherein recorded information is used to determine a perspective of spot placement error along the scan line for a particular lens used in the scanning system.

7. The method of claim 3 wherein an electronic look-up table is provided identifying spot velocity error as a function of spot position along the scan line.

8. The method of claim 7 wherein recorded information is used to determine a perspective of spot placement error along the scan line for a particular lens used in the scanning system.

9. The method of claim 3 wherein recorded information for one lens is compared with recorded information for at least one other lens.

10. The method of claim 9 wherein lenses that are compared are selected or rejected for combination into a multicolor tandem scanning imaging system based on similarity of optical performance.

11. The method of claim 7 wherein recorded information for one lens is compared with recorded information for at least one other lens.

12. The method of claim 11 wherein lenses that are compared are selected or rejected for combination into a multicolor tandem scanning imaging system based on similarity of optical performance.

13. The method of claim 7 wherein a trend line is determined for data to be put into an electronic look-up table to identify data errors from sources other than lens aberrations.

14. The method of claim 13 wherein the trend line is used to correct data before the data is placed into the look-up table.

* * * * *